Patented Dec. 26, 1922.

1,439,994

UNITED STATES PATENT OFFICE.

RAYMOND C. BENNER, OF BAYSIDE, NEW YORK, ASSIGNOR TO UNION CARBIDE & CARBON RESEARCH LABORATORIES, INC., A CORPORATION OF NEW YORK.

PROCESS OF STABILIZING STORAGE-BATTERY ELECTRODES.

No Drawing. Application filed April 29, 1922. Serial No. 557,374.

*To all whom it may concern:*

Be it known that I, RAYMOND C. BENNER, a citizen of the United States, residing at Bayside, in the county of Queens and State of New York, have invented certain new and useful Improvements in Processes of Stabilizing Storage-Battery Electrodes, of which the following is a specification.

This invention relates to improvements in processes for stabilizing finely divided metal constituting the active material of battery electrodes. More particularly, the invention provides an improved method for washing and drying formed negative plates for storage cells of the lead-sulfuric acid-lead dioxid type.

Lead produced by electrolytic reduction of lead compounds in the forming of battery plates, is susceptible when in moist condition to oxidation by atmospheric oxygen. If lead negative plates are removed from the electrolyte after being formed, and are handled and shipped without further treatment, oxidation takes place to a material extent, and the capacity of the plate for producing current, when assembled with positive electrodes and electrolyte, is correspondingly diminished. Batteries made up with such oxidized negative plates must usually be charged before they are capable of giving proper service.

In order to prevent deterioration of the negative plates, it is customary to keep them immersed in the electrolyte solution until they are required for use. This practice makes the storage and shipment of the plates a matter of difficulty. It has further been proposed to avoid the necessity for continuous immersion by stabilizing the plates by drying them in a non-oxidizing atmosphere. The present invention relates to a drying process, but is distinguishable in certain important respects from those heretofore known.

I have discovered that improved results are obtained if the negative plates are thoroughly washed with air-free water to remove electrolyte, before drying, and that it is advantageous to remove at least the greater portion of the water by means of a miscible liquid volatile at a low temperature. The volatile liquid retained by the plate may be readily expelled by means of a current of a non-oxidizing gas, such as carbon dioxid or nitrogen, or in other suitable ways.

In prior processes the washing of the plates is attended by a certain amount of oxidation. This is prevented by the procedure described above.

The following specific example is illustrative of a preferred method of carrying out the invention:

A grid is pasted with a composition comprising oxids of lead, and the oxids are reduced to metallic lead by electrolysis in sulfuric acid or other electrolyte. The formed plate is then removed from the electrolyte and washed with cold or hot water until substantially all water-soluble materials have been removed. The water should be substantially free from dissolved air. The plate is next flushed with alcohol, preferably ethyl alcohol of al out 95% strength, to take up the retained water and remove the same. The residual alcohol and traces of water are expelled by passing a stream of inert gas over the plate. Suitable arrangements for recovering the alcohol may be made, if desired.

Plates treated in the manner described are not oxidized by contact with atmospheric oxygen, even for prolonged periods. The treatment does not impair the activity of the lead, and the plates will give satisfactory service without preliminary charging. The procedure described above may be varied in many respects. For example, acetone, a mixture of alcohol and ether, or other readily volatile liquids miscible with water, may be substituted for alcohol, and the plates may be dried in a vacuum, or by heating in a substantially closed chamber, instead of in a stream of dry inert gas. Air-free water is the preferred liquid for the initial washing of the plates, but other non-oxidizing liquids capable of removing residual electrolyte or of rendering it innocuous, may be used. I may, for example, use alcohol for this purpose. These and other alternative modes of procedure fall within the scope of the invention as defined in the appended claims.

I claim:—

1. Process of stabiliznig negative electrodes for lead storage batteries, comprising washing the electrode with a readily volatile liquid adapted to remove water from the electrode, and removing the volatile liquid from the electrode.

2. Process of stabilizing negative electrodes for lead storage batteries, comprising washing the electrode successively with a nonoxidizing liquid adapted to remove electrolyte and a readily volatile liquid miscible with the first-mentioned liquid, and removing the volatile liquid retained by the electrode.

3. Process according to claim 2, in which the volatile liquid is removed by subjecting the electrode to a current of dry, non-oxidizing gas.

4. Process of stabilizing negative electrodes for lead storage batteries, comprising washing the electrode with an aqueous liquid substantially free from dissolved oxygen, removing the greater portion of the aqueous liquid with a readily volatile liquid miscible with water, and removing the volatile liquid retained by the electrode.

In testimony whereof, I affix my signature.

RAYMOND C. BENNER.